(12) United States Patent  (10) Patent No.: US 7,969,702 B2
Herrmann  (45) Date of Patent: Jun. 28, 2011

(54) INTELLIGENT POWER SUPPLY AND CABLE SYSTEM

(75) Inventor: John Edward Herrmann, Penang (MY)

(73) Assignee: Motorola Mobility, Inc., Libertyville, IL (US)

( * ) Notice: Subject to any disclaimer, the term of this patent is extended or adjusted under 35 U.S.C. 154(b) by 3388 days.

(21) Appl. No.: 09/730,691

(22) Filed: Dec. 6, 2000

(65) Prior Publication Data

US 2003/0218550 A1  Nov. 27, 2003

(51) Int. Cl.
*H02H 7/00* (2006.01)
(52) U.S. Cl. .................................................. 361/93.1
(58) Field of Classification Search ............... 361/78, 361/115, 90, 91.7, 93.1; 307/29, 38, 18, 307/40, 43, 69, 82
See application file for complete search history.

(56) References Cited

U.S. PATENT DOCUMENTS

| | | | |
|---|---|---|---|
| 4,579,407 A | 4/1986 | Shimada | |
| 4,807,149 A | 2/1989 | Mehnert | |
| 5,127,041 A | 6/1992 | O'Sullivan | |
| 5,507,668 A | 4/1996 | Lambrinos et al. | |
| 5,574,947 A | 11/1996 | Massa | |
| 5,729,204 A | 3/1998 | Fackler et al. | |
| 5,813,881 A | 9/1998 | Nathan et al. | |
| 5,886,422 A * | 3/1999 | Mills | 307/29 |
| 6,459,175 B1 * | 10/2002 | Potega | 307/149 |
| 7,646,107 B2 * | 1/2010 | Smith | 307/11 |

* cited by examiner

*Primary Examiner* — Stephen W Jackson
(74) *Attorney, Agent, or Firm* — Hisashi D. Watanabe; Philip H. Burrus, IV

(57) ABSTRACT

This invention includes a power supply having a plurality of cables, each corresponding to a unique electronic host device. The cable includes a memory device having predetermined power characteristics associated with an electronic host device. The cable further includes a unique mating connector for coupling to the electronic host device. The power supply includes a control circuit that reads the power characteristics and configures the power supply to charge the electronic host device. The system allows a user to carry a single power supply with multiple cables as opposed to having to transport many different power supplies.

7 Claims, 3 Drawing Sheets

INTELLIGENT POWER SUPPLY AND CABLE SYSTEM

TECHNICAL FIELD

This invention relates generally to power supplies for electronic devices and, more specifically, to power supplies capable of powering multiple electronic devices.

BACKGROUND

Electronic devices are being developed today at a dizzying rate. Everywhere you look, people are carrying cellular phones, compact disc (CD) players, personal digital assistants (PDAs), pagers, radios, MP3 players, and laptop computers. There is a problem with this proliferation of electronic devices, however: they seem to all use different power supplies with different connectors. Nothing is more frustrating than packing for a trip and having to leave your swimming suit at home because your suitcase is full with 4 different power supplies for your computer, PDA, phone and CD player.

There is a reason for the various power supplies and connectors. Each host device has different power requirements. For example, a laptop computer consumes much more energy than does a cellular phone. The extra power is needed to run motors like disk drives and CD-ROM players that the phone does not have. Additionally, the laptop may have to illuminate a 120 square inch screen continuously, while the cellular phone need only light a 4 square inch screen occasionally.

Another reason for the differing power supplies are the batteries associated with each device. Different rechargeable batteries have differing charging requirements. For example, a nickel-metal hydride battery may charge to a termination of 6 volts, while a Lithium-Ion battery can only be charged to 4.1 volts. If the lithium battery were charged with a nickel charger, the lithium battery could become "overcharged" when the voltage passed 4.1 volts. Under these conditions, lithium cells can release combustible gasses at high temperatures. This is known as thermal runaway and can greatly compromise battery performance.

One solution to the "multiple-device, multiple-power supply" problem is the multi-connector. Referring to FIG. 1, illustrated therein is a multi-prong adaptor 50 commonly available at electronics stores. Such an adapter 50 generally has several different prongs 10,20,30 coupled in parallel to a power cord 40. The power cord 40 may thus be connected to three different types of connections. The problem with such a device is that the power delivered by the supply is the same no matter what connection you are using. If the power supply is a 6 volt supply, you still can not charge a lithium battery with this connector (even if it does fit) because the battery may experience thermal runaway.

There is thus a need for a universal power supply capable of charging many different devices and battery types.

DETAILED DESCRIPTION OF THE INVENTION

Figure 1:
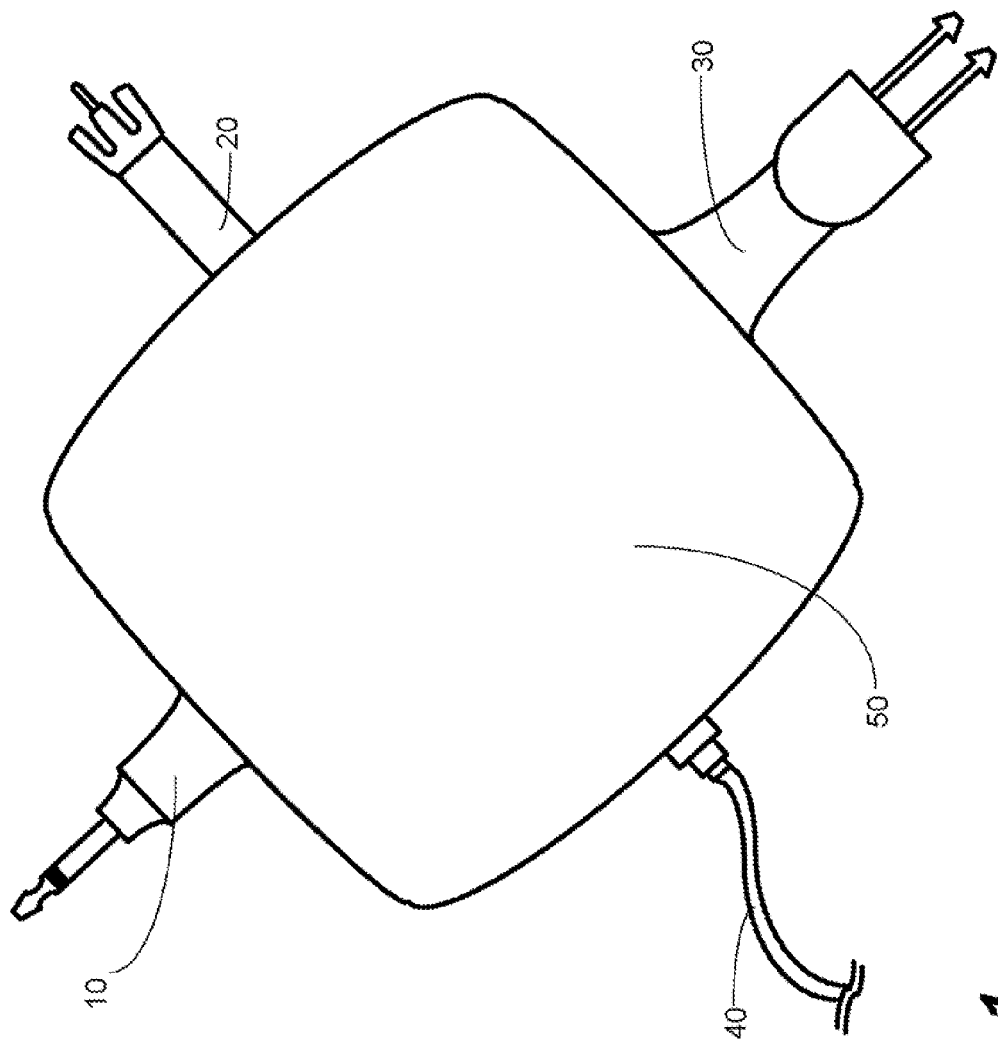
FIG. 1 is a prior art multiple-terminal connector.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is an intelligent power supply system 100 in accordance with the invention. A power supply 101 is provided having a power conversion circuit (not shown) disposed within. The power conversion circuit could be any number of well known circuits, including a fly back regulator, a step-down, or "buck", regulator, a step-up regulator, a buck-boost regulator, a resonant regulator, or similar design. In one preferred embodiment, the power conversion circuit is a fly back regulator capable of coupling to a wall outlet and converting AC power to DC power. In another preferred embodiment, the power conversion circuit is a buck regulator capable of coupling to an automotive cigarette lighter adapter.

The power supply 101 also has a control circuit 102 disposed within. The control circuit 102 is capable of configuring the power conversion circuit to deliver power at various voltages and currents. Additionally, as is described below, the control circuit is capable of tapering, stepping, and ramping voltage and current in specific ways that match the needs of the host device.

A cable 105 is provided. The cable 105 can be a conventional cable with a length of wire, or it may be as short as a typical adapter connector. The cable 105 includes a memory device 106 such as an electrically programmable read only memory (EPROM). The EPROM 106 contains host specific information, including the characteristics of the power requirements of the host device. These characteristics include: voltage termination; maximum current; temperature limits; and the like. One example of an EPROM suitable for this application is the DS2433 series memory devices manufactured by Dallas Semiconductor.

The cable 105 couples to the power supply 101 via a universal connector 104 and a mating universal connector 103. The universal connector 104 is standardized so that it may accommodate different power devices. For example, it may be desirable to connect the cable to a power supply while indoors, and then to a cigarette lighter adapter while in the car. If the universal mating connectors are of a standard configuration, the cable will work equally well with both.

In one embodiment, the cable 105 has three connecting wires disposed within. A first wire 107 is for carrying current from the power supply 101 to the host device 112. A second wire 108 is a return path for to complete the circuit between power supply and host device. A third wire 109 is a data line for transmitting data from the EPROM 106 to the control circuit 102 in the power supply 101.

At the other end of the cable 106, a device specific connector 111 connects with a mating device specific connector 113 on the host device 112. For example, if the host device is a Motorola StarTac™ Phone, the device specific connector would be the 16-pin connector manufactured by Hirose that is used by Motorola. If the host device is a Palm Pilot™, manufactured by Palm Computing, the connector would be the 10-pin connector used in the Palm cradle.

The data stored in the EPROM 106 is matched with the device specific connector 111. For example the charging algorithm for a Motorola StarTac™ phone is stored in the EPROM 106 with a Hirose connector as the device specific connector 111. When a StarTac™ cable is coupled to the power supply 101, the EPROM 106 delivers charging data to the control circuit 102 in the power supply 101. The control circuit 102 configures the power supply 101 to deliver power in accordance with the manufacturer's instructions for the host device 112. The power supply 101 then delivers power to the host device 112 through the power lines 107,108 in the cable 105. By changing the cables, the user is able to reconfigure a single power supply to accommodate many different host devices.

The cable 105 may also contain a protection circuit 110. The protection circuit 110 protects both the host device 112 and it's optional rechargeable battery 114 from overcharge in the event that an electrical component in the power supply 101 fails. For example, if the data line becomes severed such that the EPROM is no longer able to communicate with the control circuit, the optional protection circuit ensures that the optional battery in the host device never reaches thermal runaway. An example of such a protection device is a shunt regulator as recited in copending application Ser. No. 09/545,135, filed Apr. 7, 2000, which is incorporated herein by reference.

Figure 2:
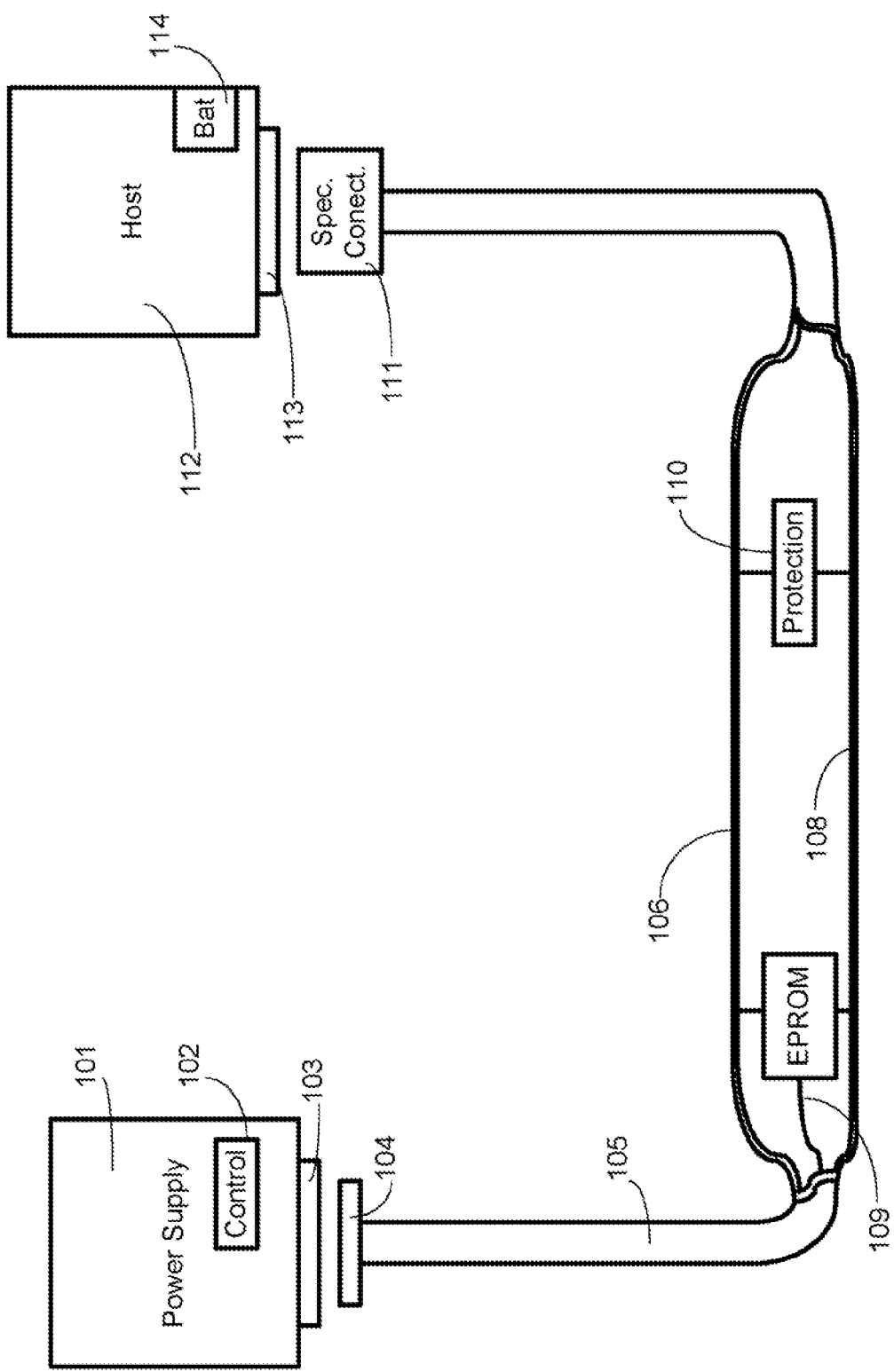
FIG. 2 is a block diagram of an intelligent power supply system in accordance with the invention.
Figure 3:
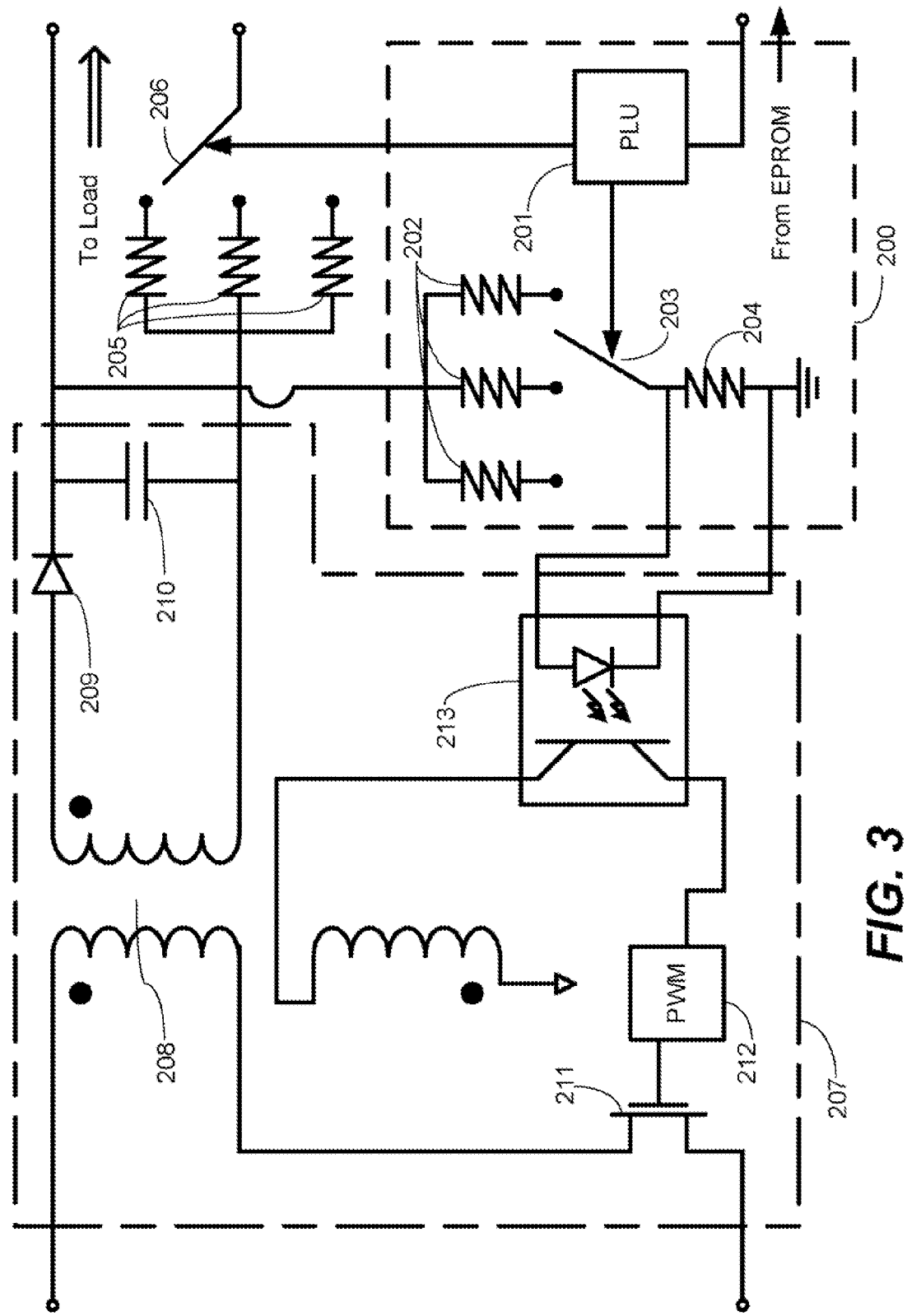
FIG. 3 is an exemplary embodiment of a control circuit in accordance with the invention.

Referring now to FIG. 2, illustrated therein is one exemplary embodiment of a control circuit 200 in accordance with the invention. The power conversion circuit 207 is a common fly back circuit as is known in the art. The fly back 207 includes a power transistor 211, a transformer 208, a fly back diode 209, and an averaging capacitor 201. The power transistor 212 is switched on and off by a pulse width modulation circuit 212.

In the control circuit 200, voltage is controlled by a voltage feedback loop wherein the output voltage is sensed by a resistor divider comprised of one of the upper resistors 202 and the lower resistor 204. A programmable logic unit (PLU) 201 selects the upper resistor 202 by actuating a three-position switch 203. This actuation and subsequent resistor selection is dependent upon the data received from the EPROM. Likewise, the current sense resistor 205 used to limit the current can also be selected.

The operation of the exemplary control circuit is best described by example. When the device specific cable is coupled to the power supply, the EPROM transmits data corresponding to the host device. For example, this may include voltage limit and current limit. When the PLU 201 receives this information, it selects the proper upper resistor 202 and current sense resistor 205. Once the proper resistors have been selected, the power supply has been configured to charge the host device.

Restating a preferred embodiment, the invention allows a user to carry a single power supply with different cables for different electronic devices. A power supply having a control circuit is provided with a plurality of cables, each having an EPROM and device specific connector for coupling to an electronic device. The EPROM stores the host device's input power requirements. The control circuit reads the information from the EPROM and configures the power supplies output voltage and current. The power supply is then able to charge the host device in accordance with the manufacturer's instructions.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as an intelligent cable for connecting to a power supply, the power supply could be integrated into a wall outlet. In this fashion, when the user were at home or in a hotel room, the user would simply connect the cable to the power supply in the outlet, thereby eliminating the need to transport the power supply.

What is claimed is:

1. An intelligent power system, comprising;
   a. a power supply having a control circuit;
   b. a cable having a memory device; and
   c. a device specific connector for mating to a host device;
      wherein the memory device has stored therein predetermined power requirements.

2. The system of claim 1, further comprising a universal connector.

3. The system of claim 2, further comprising a protection circuit.

4. The system of claim 3, wherein the predetermined power requirements are selected from the group consisting of a voltage limit and a current limit.

5. The system of claim 2, further comprising a power conversion circuit.

6. The system of claim 5, wherein the power conversion circuit is selected from the group consisting of fly back regulator, a step-down, or "buck", regulator, a step-up regulator, a buck-boost regulator, and a resonant regulator.

7. The device of claim 6, wherein the memory device is an EPROM.

* * * * *